Feb. 24, 1970  J. SEIDMAN  3,497,242

GIFT ACCOUNT CARD

Filed Oct. 21, 1968

INVENTOR.
JACK SEIDMAN
BY Seidel & Gonda
ATTORNEYS.

United States Patent Office 3,497,242
Patented Feb. 24, 1970

3,497,242
GIFT ACCOUNT CARD
Jack Seidman, Philadelphia, Pa., assignor to Heart-O-Gold, Philadelphia, Pa., a corporation of Pennsylvania
Filed Oct. 21, 1968, Ser. No. 769,268
Int. Cl. B42d *15/00*
U.S. Cl. 283—6    7 Claims

ABSTRACT OF THE DISCLOSURE

A gift account greeting card bears a plurality of indicia covered by erasable coatings. The indicia are indicative of the amount of the gift. Included with the card is a check having an erasable coating covering the amount of the check. Detachably connected to each card and each check is a tab indicating the amount of that card or check.

---

This invention relates to the structural features of gift account cards, and more particularly, gift account cards of the type wherein indicia denoting the amount of the gift are obscured by an erasable coating, so that erasure of the coating reveals the amount of the gift.

The gift account card of the present invention is intended to be utilized by banks as a stimulus for the opening of savings accounts. For example, the present gift account card may be used in connection with the opening of gift accounts wherein the donor opens a savings account for a given amount in the name of the donee.

Most gift account cards are presented to small children who are not very interested in intangible items such as savings accounts. In order to heighten the child's interest, the amount of the gift is covered by an erasable coating. The child must erase this coating in order to ascertain the amount of the gift. This heightens the child's interest in the gift as the child must erase each coating until the indicia beneath the coating becomes plainly visible. This provides an amusing and intriguing way to interest the child in the gift.

Since the amount of the gift is covered by the erasable coatings, means must be provided for the bank to identify the amount of the card without erasing the coatings. This has been done many ways in the past, none of them completely satisfactory. The present invention completely solves this problem in a most satisfactory manner by providing a detachably connected tab for each card and check. The tab has printed thereon in plain view the amount of the detachably connected card or check.

Since the tab is physically connected to each card or check, information indicative of the amount of each card or check can never be inadvertently separated therefrom. There is no need for employees of the bank to detach the tabs for any purpose. The donor will receive the card and check with the tabs intact. Only when the donor is ready to present the card and check to the donee need the tabs be detached from the card and check.

Accordingly, it is an object of the present invention to provide a gift account card of novel structure.

It is a further object of the invention to provide a gift account card having erasable coatings covering indicia indicating the amount of the gift.

It is a further object of the invention to provide a detachably connected tab for each card and check, each tab having printed thereon the amount of the detachably connected card or check.

Other objects will appear hereinafter.

For the purpose of illustrating the invention, there are shown in the drawings forms which are presently preferred; it being understood, however, that this invention is not limited to the precise arrangements and instrumentalities shown.

Figure 1:
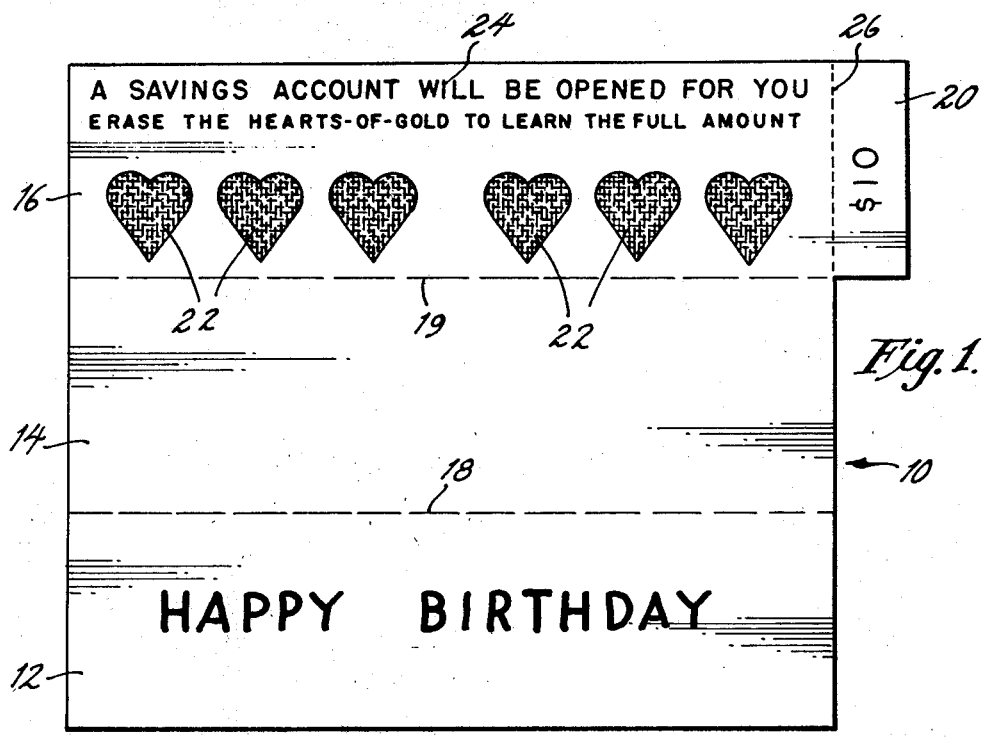
FIGURE 1 is a top view of the gift account card showing the lines along which it is folded.

Referring to the drawings in detail, there is seen in FIGURE 1 an unfolded gift account card designated generally by the reference numeral 10. The card 10 comprises a base, which may be formed of substantially rigid material such as cardboard or the like, comprising a first panel 12, a second panel 14, and a third panel 16. The first panel 12 joins the second panel 14 at a fold-line 18 which forms, in effect, a hinge. The second panel 14 joins the third panel 16 at a fold-line 19 which forms, in effect, a hinge. For convenience, the first panel 12 may be referred to as a "front" panel, the second panel 14 may be referred to as a "rear" panel, and the third panel 16 may be referred to as an "intermediate" panel.

As shown in FIGURE 1, front panel 12 may have printed thereon some form of greeting such as Happy Birthday or the like. Rear panel 14 may be left blank.

Intermediate panel 16 contains a plurality of heart-shaped erasable coatings 22. Each coating 22 may be comprised of a layer of metal applied directly to the face of panel 16 by spraying bronze powder thereon. Alternatively, the layer of metal may be gold leaf foil applied to the face by way of a roll on a hot press embossing machine. When each coating 22 is applied in the latter manner, it may be easily removed to enable the recipient to ascertain the indicia therebelow. Removal may be by an ordinary eraser.

Intermediate panel 16 also contains explanatory material 24. The explanatory material serves to apprise the donee that a savings account is being opened in his name. The donee is also informed that he may ascertain the amount of the gift by erasing the heart-shaped coatings to reveal the indicia contained thereunder.

Detachably connected to intermediate panel 16 is tab 20. The tab has printed thereon the amount contained under the erasable coatings of intermediate panel 16. The tab may be detachably connected by a perforated edge 26 or the like. The connection of the tab to the panel must be such that the tab will not become disconnected during handling of the cards. Since the tab is only removed prior to presentation of the card to donee, the amount of the gift may be always ascertained without resorting to erasure of coatings 22.

Figure 2:
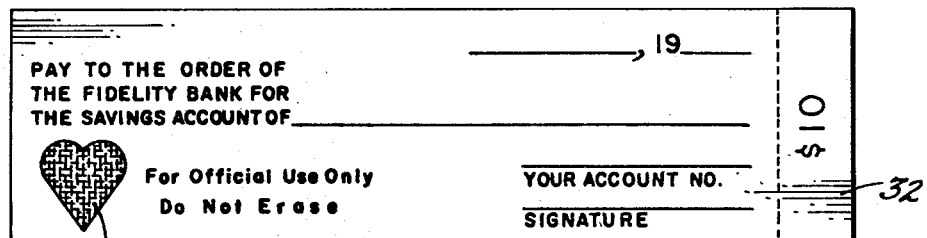
FIGURE 2 is a top view of the check that accompanies the gift account card of FIGURE 1.

FIGURE 2 shows check 28 which in inserted into folded card 10. The donor fills in the date, the name of the donee, and the donor's account number at that bank. The donor then signs the check as he would any other one. In this way, the donor need not pay for the gift account card immediately. His checking account will be debited only when the check is cashed.

The amount of the check is hidden by erasable coating 30 which is preferably similar in nature to coatings 22. The coating 30 may be erased by a bank employee to ascertain the amount of the check. Because the amount of the check is not openly printed, the donee must erase coatings 18 to ascertain the worth of the gift.

Tab 32 is detachably connected to check 28. The connection is preferably similar to the connection between panel 16 and tab 20. Tab 32 serves the same function as tab 20, i.e., to indicate the amount of the check. Therefore, even if check 28 is separated from card 10, the amount of the check can be ascertained without resorting to erasure of coating 30.

Figure 3:
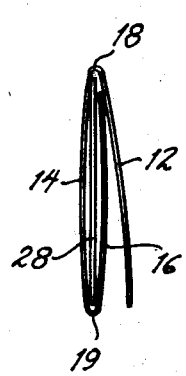
FIGURE 3 is a side view of the folded gift account card with the check therein.

FIGURE 3 shows a side view of card 10 with check 28 inserted therein. As may be seen from the drawing, check 28 is inserted between intermediate panel 16 and rear panel 14.

Upon receiving the card, the donee's glance will fall first upon front panel 12 bringing him a particular form of greeting. Upon folding back front panel 12, intermediate panel 16 will become visible. Panel 16 explains that a savings account has been opened in the name of the donee and that erasure of the heart-shaped coatings will indicate the amount of the gift. Intermediate panel 14 and rear panel 16 serve as a secure holder for check 28.

The present invention may be embodied in other specific forms without departing from the spirit or essential attributes thereof, and accordingly, reference should be made to the appended claims, rather than to the foregoing specification as indicating the scope of the present invention.

It is claimed:

1. A gift account card comprising an opaque base of substantially rigid material, said base comprising first, second and third panels, said panels being joined together by two fold-lines, said first panel overlying said second and third panels, said second panel lying intermediate said first and third panels, said third panel lying behind said first and second panels, one of said panels containing information thereon, an erasable coating obscuring said information, a tab detachably connected to one of said panels, said tab having a designation thereon, said designation on said tab corresponding to said information covered by said erasable coating.

2. A gift account card in accordance with claim 1 wherein said information is covered by a plurality of erasable coatings.

3. A gift account card in accordance with claim 1 wherein said tab is detachably connected by means of a perforated connection.

4. A gift account card in accordance with claim 1 wherein said first, second and third panels are of approximately the same size.

5. A gift account card in accordance with claim 4 wherein said tab is detachably connected to said second panel.

6. A gift account card in accordance with claim 4 wherein a check lies intermediate said second and third panels, said check having an amount thereon, said amount being covered by an erasable coating, sad amount corresponding to said information obscured by said erasable coating on said second panel.

7. A gift account card in accordance with claim 6 wherein a tab is detachably connected to said check, said check tab having data thereon, said check tab data corresponding to said amount.

References Cited

UNITED STATES PATENTS 1,402,178    1/1922    Petty _____ 283—6 X
2,274,488    2/1942    Kutscher _____ 283—6

FOREIGN PATENTS 950,508    10/1956    Germany.

LAWRENCE CHARLES, Primary Examiner

U.S. Cl. X.R.

283—58